United States Patent
Mazet

(10) Patent No.: US 7,219,005 B2
(45) Date of Patent: May 15, 2007

(54) METHOD OF DETERMINING IN REAL TIME THE FLOW RATE CHARACTERISTIC OF A FUEL INJECTOR

(75) Inventor: Henri Mazet, Chatou (FR)

(73) Assignee: Magneti Marelli Motopropulsion France SAS, Argentan (FR)

( * ) Notice: Subject to any disclaimer, the term of this patent is extended or adjusted under 35 U.S.C. 154(b) by 174 days.

(21) Appl. No.: 11/324,443

(22) Filed: Jan. 3, 2006

(65) Prior Publication Data

US 2006/0107936 A1    May 25, 2006

Related U.S. Application Data

(63) Continuation of application No. PCT/FR04/01804, filed on Jul. 8, 2004.

(30) Foreign Application Priority Data

Jul. 16, 2003    (FR) ................................ 0308659

(51) Int. Cl.
    *F02D 41/30*    (2006.01)
(52) U.S. Cl. ...................... 701/104; 123/299
(58) Field of Classification Search ................ 701/104, 701/103, 102; 123/299, 295, 305
    See application file for complete search history.

(56) References Cited

U.S. PATENT DOCUMENTS

| | | | |
|---|---|---|---|
| 6,053,150 A | 4/2000 | Takahashi et al. | |
| 6,192,855 B1 | 2/2001 | Schietecatte | |
| 6,237,567 B1 | 5/2001 | Nakano et al. | |
| 6,516,773 B2 * | 2/2003 | Dutart et al. | |
| 6,615,128 B1 | 9/2003 | Hellmich | |
| 2003/0111043 A1 | 6/2003 | Rodier | |

FOREIGN PATENT DOCUMENTS

| | | |
|---|---|---|
| DE | 19845 441 | 4/2000 |
| EP | 0937 882 | 8/1999 |
| EP | 0940 571 | 9/1999 |
| EP | 0947 686 | 10/1999 |
| EP | 0959 237 | 11/1999 |
| FR | 2 803 875 | 7/2001 |
| FR | 2 847 944 * | 6/2004 |
| FR | 2 851 788 | 9/2004 |
| WO | WO 2004/079176 | 9/2004 |

* cited by examiner

Primary Examiner—Hieu T. Vo
(74) Attorney, Agent, or Firm—Sturm & Fix LLP

(57) ABSTRACT

The method comprises the steps consisting in assuming that the gain of at least one injector is equal to a theoretical gain or an updated gain, and in replacing each of at least one reference injection of injection control duration controlled by the engine control unit in application of a stored characteristic, with a multiple injection comprising a succession of at least two injections of injection control durations that are assumed to cause the same mass of fuel to be injected as by the replaced reference injection, in determining the fuel mass difference between the reference injection and the multiple injection, in deducing therefrom an error in determining the characteristic, and in modifying the gain and/or the offset of the linear zone of the initial characteristic or at least a table or mathematical relationship for the non-linear zone of said characteristic, so as to compensate the error, and storing the new characteristic as determined in this way. Applications to real time determination as a function of the injection control duration of the flow rate characteristic of fuel injectors for internal combustion engines fed by injection.

10 Claims, 3 Drawing Sheets

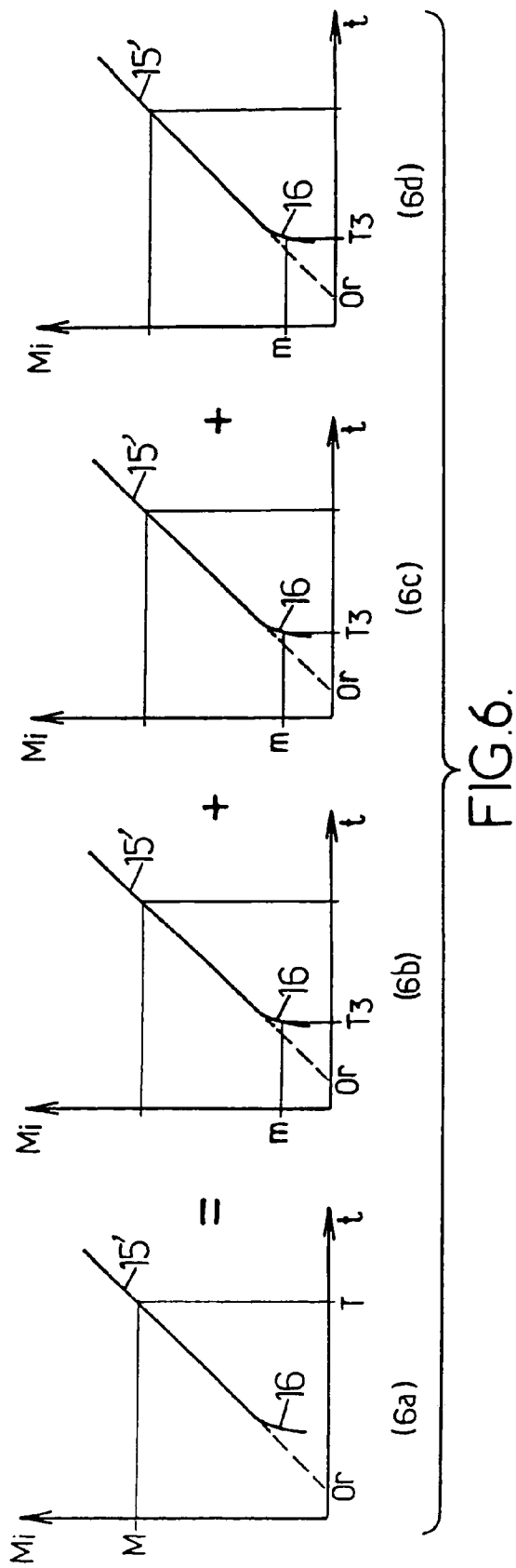

METHOD OF DETERMINING IN REAL TIME THE FLOW RATE CHARACTERISTIC OF A FUEL INJECTOR

This application is a Continuation of the application Ser. No. PCT/FR04/01804 filed on 8 Jul. 2004.

The invention relates to a method of determining the flow rate characteristic of at least one electrically-controlled fuel injector feeding an internal combustion engine and mounted in a fuel feed circuit of the engine, the determination being in real time and as a function of an injection control duration, and said circuit comprising at least one pump fed from a fuel tank and connected to a common rail for feeding fuel to the injectors of the engine, each injector being controlled by an engine control unit, itself including at least one calculator and at least one memory, generally implemented in the form of an electronic engine control unit, such that on each cycle of the engine, each injector delivers a mass of fuel to the engine as determined by said injector flow rate characteristic, which expresses the mass injected as an increasing function of the injection control duration of said injector as controlled by said engine control unit, said unit being capable also of taking account of other parameters having an influence on said characteristic, such as fuel pressure or the electricity power supply voltage.

BACKGROUND OF THE INVENTION

For injection control duration values that are greater than a minimum time, injectors of this type have a flow rate characteristic comprising a zone that is substantially linear, which zone is defined by a gain corresponding to its slope and by an offset at the origin corresponding to a floor control duration for which the injected mass is zero, and located where the extension of the linear zone towards the origin of injection control durations intersects the abscissa axis representing injection control durations on a graph where injected masses are plotted up the ordinate axis. For small values of injection control durations, the characteristic also comprises a non-linear zone between the offset and the linear zone. The local gain thus corresponds to the local slope at any point along the curve representing the flow rate characteristic of the injector.

Injectors of this type are generally qualified by their manufacturers in terms of a nominal or theoretical flow rate characteristic having nominal theoretical linear and non-linear zones initially stored in the engine control unit, e.g. in the form of a theoretical offset and a theoretical gain for the linear zone, and at least one theoretical table or chart or mathematical relationship for the non-linear zone.

Electrically-controlled fuel injectors of this type can be fitted to diesel engines or to controlled ignition engines, and they can be mounted in direct or indirect injection feed circuits, with or without fuel being returned from downstream to upstream around the pump.

It is known that the injectors used to enable the engine control unit to inject a predetermined quantity of fuel present both mutual dispersions and variations over time in their flow rate characteristics, and as a consequence injecting a given mass of fuel requires different injection control durations depending on the injector being controlled and on its aging. The dispersions in the characteristics of injectors are the result of manufacturing tolerances applicable to the physical components of the injectors, and thus to dispersions in their dimensions and physical characteristics, in particular in the number and the diameter(s) of the injection orifices of injectors, in their orientations, in the resilient characteristics of their springs, etc. . . . , and the variation of the flow rate characteristics of injectors over time is a result in particular of the physical components of the injectors aging.

Furthermore, the great majority of systems for controlling direct or indirect injection and fitted to internal combustion engines of motor vehicles provide richness control in a closed loop, and on a continuous basis while the engine is operating, by using a so-called $\lambda$ probe serving to detect the oxygen content in the exhaust gas from the engine, and connected to the engine control unit so as to guarantee delivery of an ideal air/fuel mixture, in particular when using three-function catalysts for which a stoichiometric mixture is required. Such closed loop richness control makes it possible to compensate in satisfactory manner for the dispersions in all of the components involved in measuring out the air-fuel mixture, and that might otherwise have an impact on performance in terms of controlling emission in the exhaust gas from the engine, if the above-mentioned dispersions were not compensated. The components concerned are those that serve to calculate the rate at which air is admitted to the engine and those that control the rate at which fuel is injected into the engine, so these components concerned include the injectors. However, unless using special strategies, closed loop richness control does not enable the characteristics of each of the components concerned to be identified whether individually or globally. In other words, the measuring out of the air-fuel mixture consists in controlling the rate at which air is admitted to the engine together with a corresponding fuel flow rate, with the closed loop richness control serving to compensate the ratio between the air flow rate and the fuel flow rate, but without identifying which part of the correction should be applied to the air flow rate or to the fuel flow rate, and in addition, richness control does not make it possible to calculate an individualized correction for each cylinder, and thus for each injector.

The problem on which the invention is based thus consists, starting from knowledge of a nominal or theoretical characteristic for the flow rate of an injector, in determining, in real time and as a function of injection control duration, the variation in said characteristic for at least one fuel injector of an engine, in order to determine the relationship that actually exists between the mass of fuel injected and the injection control duration for at least one injector under consideration, with this determination being done during training stages that are undertaken regularly while the engine is in operation on operating points that are not necessarily under steady conditions, and for training periods that are sufficiently short to avoid significantly degrading pollution emissions and to avoid perceptible discomfort for the occupants of the vehicle.

The training may relate not only to the flow rate characteristic of each of the injectors used in a given engine, but also to the average or global characteristic of all of the injectors of an engine under consideration, on the basis of a nominal or theoretical global characteristic defined by a nominal or theoretical global gain and a nominal or theoretical global offset, and also by a nominal or theoretical global non-linear zone.

OBJECT AND SUMMARY OF THE INVENTION

The object of the invention is thus to obtain better knowledge of the flow rate characteristic of at least one injector of an engine in operation by determining in real time the offset of the injector in question assuming that its gain is known, and also by determining the non-linear portion of its characteristic in order to be able to track variations in the individual flow rate characteristics of each of the injectors, and also to be able to track variation in the global characteristic of the injectors of an engine, taken as a whole.

In order to remedy the above-mentioned drawbacks, the method of the invention for determining the flow rate characteristic of at least one electrically-controlled fuel injector feeding an internal combustion engine and mounted in a fuel feed circuit of the type set out above, with determination being performed in real time and as a function of an injection control duration, is characterized in that it comprises at least the steps consisting in: assuming that the gain is equal to the theoretical gain or to an updated gain based on the theoretical gain; and for each injector whose characteristic is to be determined, replacing each of at least one reference injection having an injection control duration controlled by the engine control unit in compliance with the stored characteristic, with a multiple injection comprising a succession of at least two injections of injection control durations that are assumed to cause the same mass of fuel to be injected as by the replaced reference injection; in determining the difference in fuel mass between the replaced reference injection and the multiple injection; in deducing therefrom an error in the determination of said characteristic; and in modifying the gain and/or the offset of the linear zone or at least of a table or mathematical relationship for the non-linear zone so as to compensate said error, and storing the new characteristic as determined in this way.

According to the invention, it is thus considered that the individual gain of the injector in question or the global gain of all of the injectors is assumed to be known, because this parameter is subject to little drift and/or because this parameter has already been determined, e.g. by implementing a strategy known for this purpose, or the method described in French patent application No. 03/02468 in the name of the Applicant.

Replacing each of the injections of a given injection control duration by a succession of two or more injections whose sum is assumed to cause the same quantity of fuel to be injected, in order to give rise to a difference in the delivered flow rate between the single injection and the multiple injection, which difference is representative of an error in the determination of the flow rate characteristic of one or more injectors as stored in an engine control unit is a method that is sometimes used at present, but solely for determining the offset and during stages for tuning the injection system, whereas the method of the invention is distinguished by implementing an analogous strategy but in real time under demand or authorization conditions imposed by the engine control unit, and in order also to determine one or more other parameters and/or zones of the flow rate characteristic.

Implementing the method of the invention provides the advantage of making it possible to guarantee more exactly the mass of fuel that is injected into each cylinder of the engine without it being necessary to make injectors, and thus injector components, with tolerances that are very tight, and thus avoiding increasing the cost of the injection system, and as a result the invention makes it possible to guarantee that the air-fuel mixture and the torque developed by the engine are exact. This leads to good control over emissions in the exhaust gas and to making driving of the motor vehicle more agreeable. It is thus possible to make do with lower-performance injectors fitted to the engine since implementing the method of the invention makes it possible to compensate for dispersions in the physical components of the injectors.

In a preferred embodiment, the method of the invention comprises at least steps consisting in initially determining the real offset Or of said linear zone of said characteristic, the individual characteristic for a single injector or global characteristic for all of the injectors of the engine, by replacing each of at least one reference injection of injection control duration T by a multiple injection comprising a succession of injections with a number $n \geq 2$ of injections having a common injection control duration:

$$\frac{T - Ot}{n} + Ot$$

that is greater than the minimum time, and in which Ot is the nominal or theoretical offset the individual or global one according to whether one injector or all of the injectors of the engine is or are considered, and in determining that the real offset Or is given by the formula:

$$Or = \frac{Mr - Mr'}{(n-1).G} + Ot$$

where Mr and Mr' are the masses of fuel injected respectively during applications of the reference injections and of the multiple injections, n is the number of injections of each multiple injection, G is the gain of the injector or of the injectors in question, assuming that the real gain is equal to the (individual or global) theoretical or nominal gain stored in the engine control unit, which also stores the nominal or theoretical offset Ot.

It is thus possible to learn the offset for the linear zone of the individual or global characteristic respectively of one injector or of all of the injectors of a given engine.

Since the fuel mass difference between the replaced reference injection(s) and the multiple injection(s), i.e. the difference between Mr and Mr' is proportional to (n−1), the fact of replacing a reference injection by a multiple injection made up of a larger number of injections of shorter control duration makes the training method more sensitive to the flow rate difference measurable between the two injection modes. Nevertheless, any such increase in n quickly encounters a limit insofar as each of the n injections must have a control duration that is long enough to be greater than the minimum time value and to lie in the linear zone.

However it is clear that using as large as possible a number n of injections is particularly advantageous for the multiple injections used for determining the offset of the characteristic of an individual injector, since in order to make such a determination, there is a loss of sensitivity because the injected fuel mass difference is then much smaller (divided by m, where m is the number of injectors in the engine) than the fuel mass difference that is determined when the two injection modes (reference injections and multiple injections) are applied to all of the injectors of a given engine for the purpose of determining global characteristics.

Regardless of whether the engine is of the diesel or of the controlled ignition type, of whether the injection system is a direct or an indirect injection system, or of whether the fuel feed circuit does or does not have a permanent return of fuel from downstream to upstream around the pump, the above-mentioned fuel mass difference can be determined by taking account of the flow rate of air admitted to the engine, with this being known continuously to the engine control unit, and by taking account of the signal coming from a λ probe for detecting oxygen in the engine exhaust gas, providing the engine injection system is operated in a closed loop and includes such a λ probe in the engine exhaust.

Consequently, and in known manner, the injected fuel mass can be measured in each of the two injection modes (reference injections and multiple injections) on the basis of the signal coming from the λ probe and on the basis of knowledge concerning the mass of air admitted to the engine for each of its operating points, including occasions when the system is not steady while the procedure is being performed.

Thus, the injected fuel mass difference can be determined by taking account of variation in the richness of the air-fuel mixture, on the basis of a signal delivered to the engine control unit by a λ probe detecting the oxygen content in the engine exhaust gas, and on the basis of the mass of air admitted to the engine. In particular, this injected fuel mass difference can be calculated by the engine control unit on the basis of the λ probe signal and on the basis of an objective mass of fuel to be injected, said objective mass being established by taking account of the mass of air admitted to the engine and an objective richness signal.

However, when the method of the invention is implemented on an engine fuel feed circuit that is a direct injection circuit, in which a common rail is fed by a high pressure pump, itself fed by a booster pump connected to the tank, and when the feed circuit is of the type having a fixed volume without any permanent return of fuel from downstream to upstream around the high pressure pump, which pump is flow-rate controlled, and when the engine control unit has in its memory a behavior model for the circuit, then it is possible to determine the injected fuel mass difference on the basis of the circuit behavior model as a function of variation in the pressure in the fuel circuit following a disturbance imposed on the operation of the pump, as described in French patent No. 2 803 875.

Under such circumstances, it is advantageous for the disturbance in the control of the high pressure pump to consist in causing said pump to stop, with the injected fuel mass difference then advantageously being determined from pressure drops in the fuel circuit each time the feed pump is stopped, firstly while applying at least one reference injection and secondly while applying the replacement multiple injection(s), the circuit behavior model causing each pressure drop to correspond to an injected fuel mass.

After determining the flow rate characteristic for injection control durations longer than the minimum time, i.e. after the linear zone of the characteristic has been determined, the method of the invention comprises at least steps consisting in determining said non-linear zone, and to this respect in replacing each of at least one reference injection of injection control duration T in said linear zone, corresponding to an injected mass M, with a multiple injection comprising a succession of n≧2 injections assumed to give the same injected mass of fuel M as the replaced reference injection and having a common injection control duration Tn situated in the non-linear zone, so as to identify the flow rate characteristic at the corresponding point of its non-linear zone, for which the control duration of each injection of a multiple injection $$Tn = \frac{T - Or}{n} + Or$$

corresponds to an injected mass of fuel M/n, and in varying n and/or Tn in order to identify at least a fraction of the non-linear zone.

In this case also, it is possible to determine the individual non-linear zone of a single injector under consideration, or the global non-linear zone when taking all of the injectors into consideration, depending on whether the individual nominal or theoretical non-linear zone offset and gain are taken into consideration or the global nominal or theoretical non-linear zone offset and gain are taken into consideration.

In a variant, in order to determine the non-linear zone after the linear zone has been determined, the method of the invention may consist in imposing an injection control duration T2 in the non-linear zone for which it is desired to determine the characteristic, and in replacing each of at least one reference injection of injection control duration T in the linear zone corresponding to an injected mass M with a multiple injection of n≧2 injections assumed to give the same injected mass of fuel M as the replaced reference injection, and one of which has an injection control duration T1 situated in the linear zone, corresponding to an injected mass M1, while each of the other injection(s) has a common imposed injection control duration T2, each corresponding to an injected mass M2 such that:

$$M2 = \frac{M - M1}{n - 1}$$

and in varying T2, less than the minimum time, and/or varying n, so as to determine at least a portion of the non-linear zone.

In this variant likewise, the non-linear zone can be determined globally, i.e. for all of the injectors of an engine, or individually, i.e. for one injector or for each of them, but with less sensitivity for individual injectors.

Similarly, in both implementations of the method of the invention for determining the non-linear zone, the above-described determination of the injected fuel mass difference, Mr–Mr' or M–M1 can be obtained either on the basis of the flow rate of air admitted to the engine and of a signal coming from the λ probe, or, in the special circumstance of a circuit having no fuel return from downstream to upstream around the pump, in a direct injection system in which the engine control unit has a behavior model for the circuit and applies flow rate control to the pump, by stopping the pump and measuring pressure drops respectively while applying reference injections and multiple injections, so as to deduce therefrom the injected fuel masses, by making use of the circuit behavior model.

As mentioned above, the method of the invention can be applied either to all of the injectors of an engine, or else to a single injector at a time, in which case the method is advantageously applied successively to each of the injectors of the engine so as to determine their individual characteristics.

BRIEF DESCRIPTION OF THE DRAWINGS

Other advantages and characteristics of the invention appear from the description given below by way of non-limiting example of embodiments described with reference to the accompanying drawings, in which:

FIG. 6 is a figure analogous to FIGS. 4 and 5 and shows a set of four characteristics, one corresponding to a reference injection in the linear zone (FIG. 6*a*), and the other three of which correspond to a multiple injection comprising three successive injections at the same point in the non-linear zone (FIGS. 6*b*, 6*c*, and 6*d*).

MORE DETAILED DESCRIPTION

Figure 1:
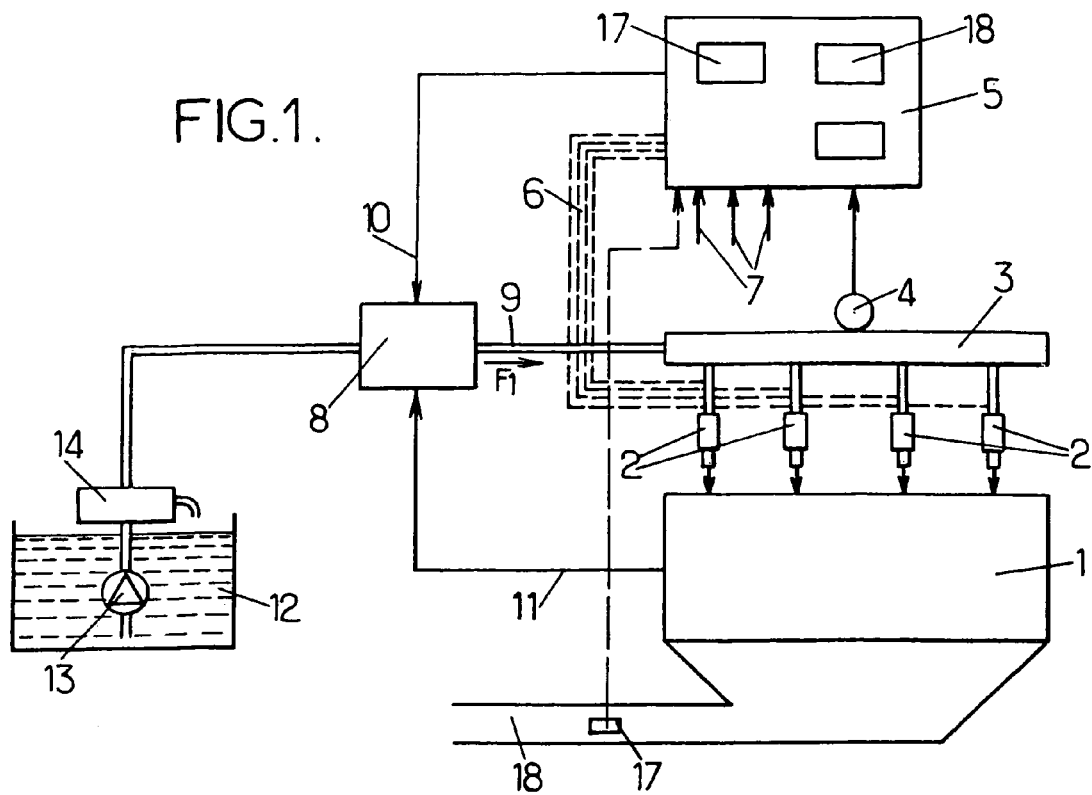
FIG. 1 is a diagram of a fuel feed circuit for a direct injection motor vehicle internal combustion engine, suitable for implementing the method of the invention.

FIG. 1 is a diagram showing an internal combustion engine 1 of a motor vehicle. By way of example, the engine in question 1 is an engine having four cylinders in line with controlled ignition and a four-stroke engine cycle, being fed with fuel by so-called "direct" injection, even though the method of the invention is applicable to an engine using indirect injection and/or to a diesel type engine.

The fuel is injected into each cylinder of the engine 1 via a respective one of four injectors 2.

These injectors 2 are fed with fuel at high pressure by a common fuel rail 3 in which the fuel pressure is determined, at least at certain instants of the engine cycle, by a pressure sensor 4 making a measurement and transmitting a measured pressure signal to an engine control unit 5, or by said unit 5 performing calculations on the basis of certain measurements made by the sensor 4 at various instants in the engine cycle, as proposed in French patent No. 2 803 875.

The engine control unit 5 is an electronic unit controlling the injection of fuel into the engine 1, acting via a bundle of electrical control conductors 6 to determine instants and durations of injection controls of the injectors 2, and also controlling ignition in the cylinders of the engine 1, in the example described of a controlled ignition engine, and possibly also controlling other functions, such as controlling the admission of air into the engine via a motor-driven butterfly valve, as a function in particular of the extent to which the accelerator pedal is pressed down, and other safety functions such as functions preventing the wheels of the vehicle skidding, slipping, and/or locking. In well-known manner, the electronic unit 5 comprises at least one calculator having calculator circuits, memory circuits, and comparator circuits, in particular, and in its injection control function, the unit 5 controls and monitors the quantity of fuel injected via each of the injectors 2 into the corresponding cylinder of the engine 1, as a function of crank shaft angle for each of the cylinders, of engine operating parameters and conditions, in particular its speed, its load, or its temperature, and of demand for fuel, as a function in particular of the air admission flow rate into the engine 1 and of the torque that the engine is required to develop, these parameters being input at 7 into the engine control unit 5.

In this example, the common rail 3 is fed with fuel at high pressure by a high pressure pump 8 under delivery rate control and connected to the rail 3 by a pipe 9 in which the fuel flows in the direction of arrow F1, and the engine control unit 5 controls the high pressure pump 8 over a logical connection 10, thereby determining the mass of fuel delivered by the high pressure pump 8 into the rail 3 for each cycle of the engine 1.

The high pressure pump 8 is rotated by the engine 1 via a mechanical connection represented by link 11, in a manner that is known in itself. The high pressure pump 8 is itself fed with fuel by a booster circuit comprising, from upstream to downstream: a fuel tank 12, a booster pump or low pressure pump 13 immersed in the tank 12 and fed via a filter (not shown); and a fuel pressure regulator 14 having one outlet that enables excess fuel to be returned to the tank 12 and having another outlet connected to the admission of the high pressure pump 8 where there is installed a solenoid valve (not shown) under on/off control from the unit 5 via the logic connection 10, such that the fuel delivery rate through the high pressure pump 8 is known to the control unit 5, which unit can control this inlet valve in such a manner as to impose a zero delivery rate on the high pressure pump 8.

The circuit for feeding the engine 1 with fuel by direct injection is thus a high pressure circuit, comprising the high pressure pump 8 and the members downstream therefrom, i.e. the pipe 9 and the common rail 3, and said high pressure circuit which is a circuit of fixed volume and without any permanent fuel return or without any recirculation of fuel from the downstream end to the upstream end of the high pressure pump 8, is fed by a low pressure booster circuit upstream from the high pressure pump 8, and comprising the tank 12, the pump 13, and the regulator 14.

Thus, the mass of fuel present in the high pressure circuit is the result only of filling actions performed by the high pressure pump 8 and of fuel being injected into the engine 1 via the injectors 2, these actions being controlled by the unit 5.

Figure 2:
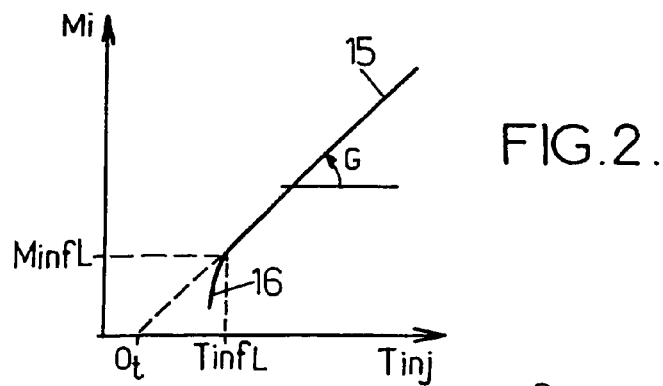
FIG. 2 is a graph showing a flow rate characteristic that may be the overall characteristic of all of the injectors in the FIG. 1 circuit, or an individual characteristic for a single injector.

The flow rate characteristic of an injector 2, i.e. a plot of mass of injected fuel Mi as a function of the duration of the injection control signal Tinj, as determined by the unit 5, corresponds to an increasing function presenting a curve shown in FIG. 2 that has a slope equal to the local gain G of the injector, which gain is associated with any value for duration of injection and is defined as the ratio of variation in the injected mass as the result of a small variation in injection duration divided by said variation in injection duration. This curve has a zone 15 that is substantially linear, in which the gain G is constant, and a zone 16 that is non-linear at small values for injection control duration (values shorter than a minimum time corresponding to the bottom limit of linearity TinfL), and in which local gain varies rapidly.

The linear zone 15 of the characteristic is determined not only by its slope or constant gain G for the injector in this zone, but also by an offset at the origin Ot where the linear portion 15 of the curve, when extended towards the origin, intersects the abscissa axis, along which injection control duration Tinj are plotted.

It is known that the mass MinfL injected for an injection control duration equal to the bottom limit TinfL of the linear zone 15 is equal to the sum of the masses injected during the transient phases corresponding respectively to the phases of establishing and interrupting the instantaneous flow rate of the injector 2 as caused respectively by the injector 2 being opened and closed as a result of movements of a shutter member of said injector respectively when an excitation current is initiated and interrupted in a coil of an electromagnetically-controlled injector, and following on respectively from the beginning and the end of a logic instruction for controlling injection as generated by the unit 15 and transmitted from the unit 15 to the injector 2 under consideration via a corresponding conductor in the bundle 6.

In general, injectors 2 of any given type are qualified by a theoretical injector flow rate characteristic that is determined firstly by a theoretical gain Gt and a theoretical offset Ot so as to define the theoretical linear zone 15 of the curve, and secondly by a theoretical non-linear zone 16 that is the result of applying one or more mathematical relationships and/or relationships stored in the unit 5 as tables or charts giving the mass injected Mi for an injection control duration Tinj lying between the bottom limit of linearity TinfL and the theoretical offset Ot, and within the range of injection control durations corresponding to the non-linear zone 16.

Starting from this theoretical characteristic which can be individual (for one injector 2) or global (for all of the injectors 2), the method of the invention seeks to determine this characteristic in real time (i.e. while the engine 1 is in operation) either individually (for one and preferably for each of the injectors 2 in succession), or globally (for all of the injectors 2 of the engine 1), by beginning with training on the linear zone of the characteristic, and for this purpose it is considered that the gain G is constant and remains equal to the theoretical gain Gt, or to an updated gain based on the theoretical gain, e.g. obtained by implementing the method described in French patent application FR 03/02468 in the name of the Applicant. The gain G can be considered as being constant since its value is subject to little drift.

Consequently, learning of the linear zone of the characteristic amounts to learning the real offset Or of said linear zone.

To this end, during a training or learning time interval and for example for all of the injectors 2 if it is the global real offset of the linear zone of the global fuel rate characteristic of the injectors 2 that is to be determined, the engine control unit 5 takes a certain number of "reference" injections having injection control durations situated in the linear zone 15 of the nominal theoretical characteristic and corresponding to the needs of the engine 1 for these current operating points of the engine as determined by the unit 5, and causes them to be replaced by the same number of multiple injections, each constituted by a succession of at least two injections each of which having a respective injection control duration that is greater than the minimum time and that is thus likewise situated in the linear zone of the starting characteristic. Typically, each reference injection is replaced by a multiple injection comprising two successive injections, with the effective duration of each injection, i.e. its injection control duration minus the available offset, i.e. the theoretical offset Ot, is equal to half the effective injection duration of the reference injection, such that the two successive injections of the multiple injection are assumed to inject into the engine the same mass of fuel as would have been injected by the replaced reference injection.

In other words, under such circumstances, each reference injection of an injection control duration equal to T (in the linear zone and thus greater than the minimum time) is replaced by a multiple injection comprising two consecutive injections, each having an injection control duration equal to $$\frac{T - Ot}{2} + Ot$$

whereas the mass of fuel Mr actually injected by the reference injection, or the reference injected mass, is given by the formula:

$$Mr = G \times (T - Or)$$

where Or is the looked-for real offset, and where the mass Mr' that is injected by the two successive injections of a multiple injection can be expressed by the following formula:

$$Mr' = 2G\left(\frac{T - Ot}{2} + Ot - Or\right)$$

in which:

Mr and Mr' are the masses injected respectively during the reference injection and during the multiple injection (two injections in this example);

G is the global gain of the injectors 2 (assuming that this gain is equal to the theoretical global gain);

Or is the real global offset for the global characteristic of the injectors 2;

Ot is the theoretical global offset as stored in the unit 5; and

T, as already mentioned above, is the injection control duration for the selected reference injection in the linear zone.

On the basis of the above formulae expressing Mr and Mr', it can be seen that the real offset Or and the gain G are associated by the following formula:

$$Or = Ot + \frac{Mr - Mr'}{G}$$

More generally, if each reference injection (of injection control duration T in the linear zone) applies to the injectors 2 during the training period is replaced by a multiple injection comprising $n \geq 2$ injections, each having an injection control duration that is long enough to be greater than the minimum time TinfL, then each of the $n$ injections of a multiple injection has an injection control duration equal to:

$$\frac{T - Ot}{n} + Ot$$

The mass of fuel injected by each multiple injection is then equal to:

$$Mr' = nG\left(\frac{T - Ot}{n} + Ot - Or\right)$$

The real offset is then calculated by the following formula:

$$Or = \frac{Mr - Mr'}{(n-1).G} + Ot$$

Since the difference between Mr and Mr' is proportional to (n−1), the fact of replacing each reference injection by a multiple injection constituted by a greater number of shorter injections makes the training method more sensitive to the measurable injected fuel mass difference between the two modes of injection (reference injections and multiple injections).

The method of determining the real offset, as described above, can be applied to only one of the injectors 2, taking account of the individual theoretical offset and the individual gain of said injector 2, so as to determine the individual real offset. However it will be understood that such determination is performed with a certain loss of sensitivity, since the difference between the injected masses of fuel, between applying reference injections and applying replacement multiple injections using the injector in question is smaller than when determining the global real offset, and to a first approximation, it can be assumed that the difference in injected mass between the two modes of injection on a single injector 2 is equal to the ratio of said difference as calculated for defining the global real offset divided by the number m of injectors, assuming that training is performed using the same numbers of reference and replacement injections and the same replacement multiple injections.

Thus, to determine the global or individual real offset, it is necessary to determine the difference in the injected mass of fuel Mr–Mr'.

This difference in the injected mass of fuel can be determined from the variation in the richness of the air fuel mixture and knowledge of the mass of air admitted into the engine 1, in practically all injection systems whether they are direct or indirect, on engines that are gasoline or diesel engines, and with fuel feed circuits that are not necessarily of the specific type described above, i.e. of fixed volume, with a flow rate control pump and having no return of fuel from downstream to upstream of the pump, and for which a model of the behavior of the circuit is known to the engine control unit 5, with the proviso that such injection systems include richness monitoring in a closed loop as provided by means of a λ probe 17 disposed in the exhaust line 18 from the engine 1, serving to detect the oxygen content of the exhaust gas, where said probe λ is connected to the unit 5 in order to transmit signals thereto.

In conventional manner, evaluating the mass of fuel injected during each of the two above-specified injection regimes can consist in dividing the mass of air admitted to the engine during each of these phases as measured by the control unit 5 by a term that is proportional to the coefficient λ, itself measured by the λ probe 17 or calculated from the signal delivered by said probe using the formula:

$$\lambda = \frac{A/F}{(A/F)s}$$

where A and F are the measurements respectively of air and of fuel, and where the index s corresponds to the stoichiometric value of the ratio A/F. It is known that the coefficient λ can be measured directly if the engine 1 is fitted with a proportional λ probe 17 in its exhaust 18, and, alternatively, that the coefficient λ can be deduced using the correction value that is provided by the richness closed loop if the system includes a λ probe 17 of the on/off type.

In a manner well known to the person skilled in the art, the injected fuel mass can be calculated by the unit 5 on the basis firstly of the signal from the λ probe, and secondly of an objective quantity or mass of fuel to be injected, itself established by taking account of an objective richness signal and an objective mass of air as calculated by the unit 5.

By way of example, in stabilized nominal operation, i.e. after the closed loop injection control performed by the unit 5 and the λ probe 17 has recentered the value of the mass of fuel injected on the objective mass as determined in the unit 5, and a self-adaptive correction has recentered the mean value of the corrective coefficient λ of the closed loop, any drift in the coefficient λ as a result of applying a specific injection control, i.e. applying multiple injections instead of reference injections, is representative of a variation in the mass of injected fuel equal to:

$$Mr' - Mr = M\frac{\lambda' - \lambda}{\lambda}$$

in which:

Mr' is the mass of fuel injected while applying multiple injections;

Mr is the mass of fuel injected on the same operating point of the engine while applying reference injections (without applying a specific control);

M is the value of the objective mass of fuel, as calculated by the engine control unit 5 for the operating point under consideration of the engine;

λ is the value of the coefficient λ expected before applying multiple injections (said value possibly being measured, if stability conditions make that possible); and λ' is the value of the coefficient λ as measured after applying multiple injections.

This determination of the injected fuel mass difference can be performed even if the system comprising the feed circuit and the injection engine is not stable during the determination procedure.

However since the circuit shown in FIG. 1 is a particular circuit, of fixed volume and without return enabling fuel to go from downstream to upstream around the pump 8, and since the pump is under delivery rate control from an engine control unit 5 that stores in its memory a model of the behavior of the circuit, the difference between the masses of fuel injected during the two regimes of applying reference injections and of applying replacement multiple injections can be measured in another manner on the basis of the variation in the pressure in the fuel circuit due to a disturbance introduced to the operation of the feed pump 8, and in particular due to the feed pump 8 being stopped firstly during the application of reference injections, and secondly during the application of multiple injections, by using the model for behavior of the circuit which makes each measured sudden drop in pressure correspond to a mass of fuel that has been injected, in accordance with the teaching of French patent No. 2 803 865.

According to that patent, the correspondence between a pressure drop in the rail 3 and a mass of fuel injected into the engine 1 is determined in the unit 5 using a module 18 for the behavior of the high pressure feed circuit, said module comprising a memory storing in the form of tables or charts a relationship giving the variation in mass of fuel in the high pressure circuit as a function of the pressure drop determined in said circuit while the pump 8 is stopped.

Figure 3:
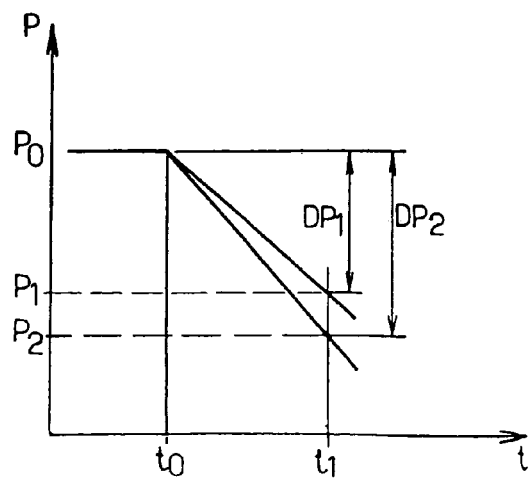
FIG. 3 shows how pressure in the common rail of the FIG. 1 circuit varies as a function of time in the event of two pressure drops caused by the pump of the FIG. 1 stopping, each obtained for a respective one of two different injection regimes, implemented for a certain number of injections on all of the injectors or on only one of them.

This measurement of the difference between the masses of fuel injected during application of the two above-mentioned injection regimes (reference injections and replacement multiple injections) can be performed in the manner described below with reference to FIG. 3 which shows how the pressure P varies as a function of time t in the common rail 3.

Starting from a state at an instant $t_0$ in which the engine 1 is operating while a pressure $P_0$ exists in the rail 3, the unit 5 causes the pump 8 to stop while reference injections of an injection control duration situated in the linear zone 15 of the flow rate characteristic are being applied to the injectors 2. The pressure P drops from $P_0$ at the instant $t_0$ when the pump 8 is stopped to the pressure $P_1$ at the instant $t_1$ which corresponds to the end of the period during which flow through the pump 8 is blocked, and after a sufficient number of reference injections has been applied to the injectors 2 to ensure that the pressure drop of value $DP_1=P_0-P_1$ can be measured with sufficient accuracy by the sensor 4, this pressure drop $DP_1$ being the result of feeding the cylinders of the engine 1 via the injectors 2 from the rail 3 while the rail 3 is no longer being fed by the pump 8.

By means of the model for behavior of the high pressure circuit, stored in the module 18 of the unit 5, and by relying for example on the mass of fuel entering the rail 3 and imposed by the high pressure pump 8 as determined by the calculator 17 of the unit 5, and on the mass leaving the rail 3 by being injected into the engine 1, and likewise determined by the unit 5, and also on the rigidity of the high pressure circuit, a first mass of fuel as injected into the engine 1 by all of the injectors 2 corresponds to the pressure difference $DP_1$ as determined in this way, thus obtaining the above-mentioned mass Mr.

After the disturbance to the operation of the high pressure pump 8 has been eliminated and the engine 1 has returned to normal operation at the operating point under consideration, a second stage of measuring mass is initiated, consisting in reintroducing the same disturbance as before to the operation of the high pressure pump 8, i.e. stopping its flow for a time interval $t_1-t_0$ during which the same number of replacement multiple injections are applied as the number of reference injections were applied during the same time interval $t_1-t_0$ that led to the pressure drop $DP_1$. Applying these replacement multiple injections while the flow rate through the pump 8 is zero, leads to a pressure drop $DP_2$ from the initial pressure $P_0$ to a pressure $P_2$ at the instant $t_1$. By means of the module 18 in the unit 5, in which the model for the behavior of the high pressure fuel circuit is recorded and stored, a second fuel mass that has left the high pressure circuit by being injected by the injectors 2 into the engine 1 is made to correspond with this second pressure drop $DP_2$, this second fuel mass being the above-mentioned mass Mr'.

The unit 5 can then calculate the difference in injected fuel masses Mr−Mr', thus making it possible to calculate the real offset Or.

The linear zone of the global flow rate characteristic can thus be updated and stored in the unit 5.

To update and store the linear zone of an individual flow rate characteristic for an injector 2, it suffices to reproduce the above-described process by applying the same normal and/or reference injections during two stages of injection application on all of the injectors 2 except for the injector whose characteristic is to be determined, with that injector 2 being the only injector to which reference injections are applied during the first stage and then replacement multiple injections during the second stage. Naturally, under such circumstances, in order to obtain the same sensitivity as before, the same number of reference injections and of replacement multiple injections to be applied should be greater in order to take account of the fact that the difference in injected fuel mass is the result of the contribution of a single injector 2.

It should be observed that the two stages can be performed in the opposite order, with the injected mass Mr' resulting from applying replacement multiple injections being determined before the injected mass Mr resulting from the application of reference or normal injections, or indeed the non-adjacent succession of two phases can be repeated a certain number of times with the order of the phases being reversed in alternation. However, in order to obtain a good learning of the real offset Or and of the linear zone of the overall or an individual flow rate characteristic, the training procedure should be renewed for different operating points of the engine over a large enough number of values for injection control duration in the linear zone for reference injections, and possibly for different numbers of injections of replacement multiple injections.

Once the linear zone of the global or individual flow rate characteristic has been updated and stored, through the knowledge of the real offset Or and the gain G, it remains to determine the non-linear zone of this characteristic.

It is assumed that a theoretical or nominal non-linear zone for the theoretical or nominal flow rate characteristic is known and stored in the unit 5. To determine the real global or individual non-linear zone, the method of the invention proposes, after determining the linear zone of the flow rate characteristic, i.e. for injection control durations greater than the minimum time, identifying utilization conditions for all of the injectors 2 (determining the global characteristic), or of a single injector 2 (determining the individual characteristic) in the linear zone, and then subdividing each reference injection in the stored updated linear zone in a number n equal to at least two injections of a replacement multiple injection such that the sum of these n injections is supposed to give the same injected fuel mass as a single reference injection.

Three examples are described below with reference respectively to FIGS. 4, 5, and 6, the two examples of FIGS. 4 and 5 corresponding to a first implementation, and the example of FIG. 6 corresponding to a second implementation.

In the first implementation (FIGS. 4 and 5), if it is desired a priori to impose an injection control duration value T2 selected from the non-linear zone, for which it is desired to determine the corresponding point of the real or updated non-linear zone of the flow rate characteristic, each of a certain number of reference injections having an injection control duration in the real or updated linear zone is replaced by a replacement multiple injection made up of a succession of n injections such that (n−1) injections have an identical injection control duration equal to T2 and with the nth injection having an injection control duration T1 (or T'1) in the linear zone of the real or updated characteristic, and such that the sum of the (n−1) injections of control duration T2 plus the injection of control duration T1 (or T'1) is assumed to cause the same mass of fuel to be injected as would be injected by the single reference injection of control duration T.

For example, when determining the global characteristic, if the set of injectors 2 has a nominal flow rate characteristic, then dividing each injection control duration into n̲ injections as mentioned above should have no influence on the total mass of fuel injected. However if the mass injected by applying replacement multiple injections is different from the expected mass, i.e. the mass obtained when applying reference injections, then the difference compared with said expected value is representative of the flow rate error for the set of injectors 2 at the point corresponding to the injection control duration T2 selected in the non-linear zone, compared with the expected value, with reference to the theoretical or nominal non-linear zone. By renewing the operation for a plurality of predetermined values of the injection control duration T2 in the non-linear zone, it is possible to reconstruct the non-linear zone of the global characteristic for the injectors over the entire range of injection control durations shorter than the minimum time.

Figure 4:
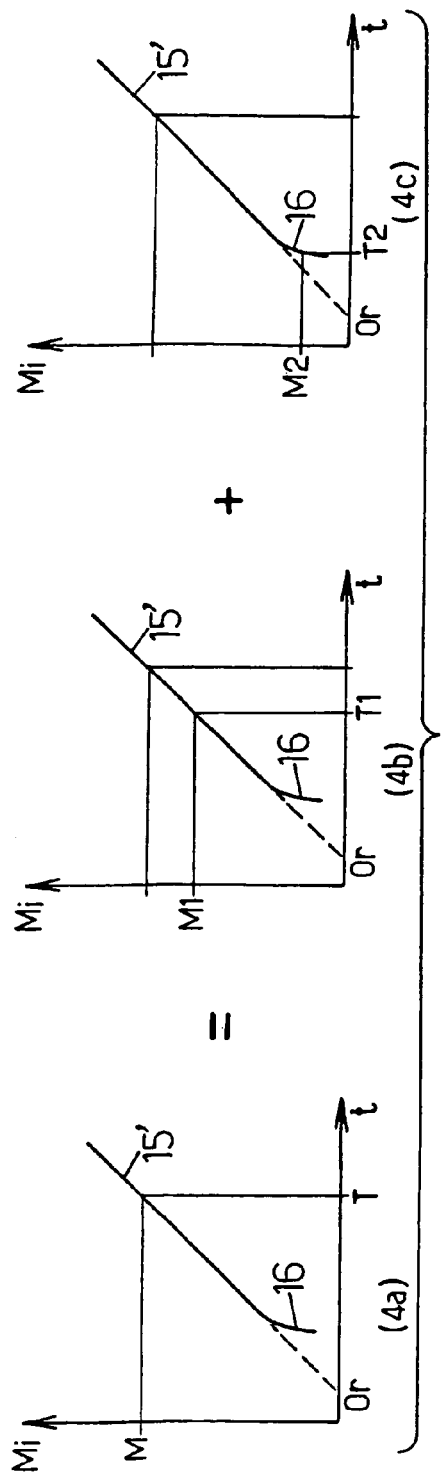
FIG. 4 is a set of three characteristics representing the replacement of a reference injection (FIG. 4*a*) in the linear zone by a multiple injection having two consecutive injections, one of which is in the linear zone (FIG. 4*b*) and the other of which is in the non-linear zone (FIG. 4*c*)

In FIG. 4, the curve 4a shows the already-determined linear zone 15' of the flow rate characteristic for which the non-linear zone 16 is theoretical or nominal, and a reference injection of control duration T in the updated linear zone 15' serves to inject a mass of fuel M. This reference injection is replaced by a multiple injection made up of a succession of two injections, one represented by the curve 4c having an injection control duration T2 selected to lie in the theoretical or nominal non-linear zone 16 and corresponding to an injected mass of fuel M2 that is to be determined in order to discover accurately the corresponding point in the updated non-linear zone. The other injection (see curve 4b) of the replacement multiple injection corresponds to an injection control duration T1 in the updated linear zone 15' and corresponds to an injected fuel mass M1 that is determined accurately because of the already-performed determination of this linear portion 15' of the characteristic. The control duration T1 is selected so that the sum of the two injections having control durations T1 and T2 is supposed to inject the same mass of fuel M as the reference injection of control duration T on curve 4a. Thus, a priori M=M1+M2. From which M2=M−M1. Since the values M and M1 are known accurately, given that they are determined from the updated linear zone 15' of the characteristic, an accurate value is obtained for the mass M2, such that the point (T2, M2) on the real non-linear zone is determined precisely.

Figure 5:
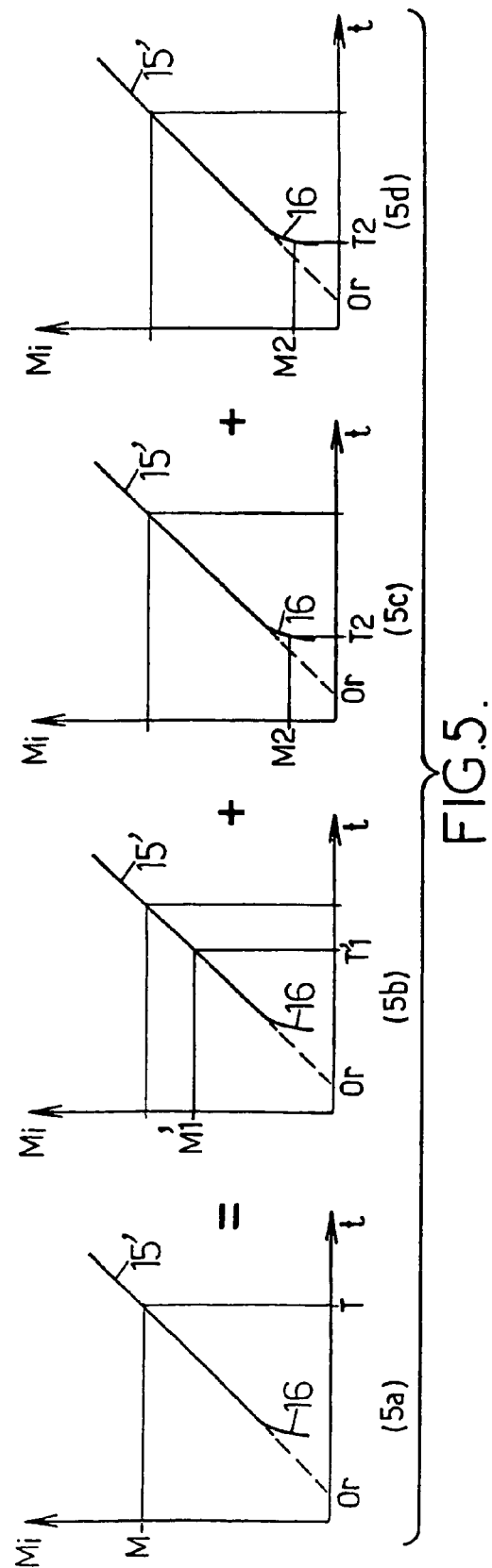
FIG. 5 shows a set of four characteristics one for a reference injection in the linear zone (FIG. 5*a*), and the other three for a multiple injection comprising three successive injections, one of which is in the linear zone (FIG. 5*b*), and the other two of which are at the same point in the non-linear zone (FIGS. 5*c* and 5*d*)

The example shown in FIG. 5 differs from that described above with reference to FIG. 4 only by the fact that the reference injection of control duration T in the updated linear zone, which corresponds to injecting a mass of fuel M, shown on curve 5a, is replaced by a multiple injection constituted by a succession of three injections, two of which shown in curves 5c and 5d each have the control duration T2 selected to be in the theoretical or nominal non-linear zone 16, and corresponding to an injected mass M2, while the third injection is shown on curve 5b and corresponds to a control duration T'1 in the updated linear zone 15' of the characteristic, and corresponds to an injected mass of M'1. Since the sum of these three injections on the curves 5b, 5c, and 5d is supposed to inject the same mass of fuel M as the single reference injection of control duration T on curve 5a, this gives M=M'1+2M2, in other words:

$$M2 = \frac{M - M1'}{2}$$

In the more general case, if the replacement multiple injection is constituted by a succession of n̲ injections, of which (n−1) have a control duration T2, and the last has a control duration in the updated linear zone and corresponds to an injected mass M1, then the mass M2 injected by each of the (n−1) injections is given by:

$$M2 = \frac{M - M1'}{(n-1)}$$

In the second implementation, one example of which is described below with reference to FIG. 6, the n injections of each replacement multiple injection have the same injection control duration Tn selected to lie in the theoretical or nominal non-linear zone 16, in such a manner that their assumed sum should cause the same mass of fuel to be injected as a single replaced reference injection having an injection control duration T in the updated linear zone 15' of the characteristic, which corresponds to injecting a mass of fuel M that is known accurately. It is thus possible to identify the updated non-linear zone of the flow rate characteristic at the corresponding point, since it corresponds to the injection control duration Tn with the injected mass of fuel m being equal to M/n.

The example of FIG. 6 is one in which each reference injection of control duration T in the updated linear zone 15' corresponding to an injected mass M is replaced by a multiple injection constituted by a succession of three identical injections having the same control duration T3 in the theoretical or nominal non-linear zone 16, corresponding to injecting a mass of fuel m, such that the sum of these three successive injections of a replacement multiple injection leads to a mass equal to M being injected. Thus, M=3m, or m=M/3. This makes it possible to determine accurately the point (T3, m̲) in the updated non-linear zone, which can be reconstituted by varying T3 and possibly also n (which is equal to 3 in the example of FIG. 6).

Under such circumstances, it will be understood that the injection control duration Tn of each injection of the replacement multiple injection is equal to:

$$\frac{T - Or}{n} + Or$$

since n(Tn−Or)=T−Or, if it is considered that the n injections of a replacement multiple injection inject the same mass of fuel as a single reference injection, insofar as the gain G is constant and the same for the various injections.

In order to confirm the injected mass values read from the linear zones of the characteristics, or for comparing to the read values, or indeed instead of these readings, the injected masses or the injected mass differences can be determined by applying the above-described method involving the richness coefficient λ and the mass of air admitted into the engine, or if the structure of the high pressure circuit makes it possible, by the method making use of the circuit behavior module which causes the masses of injected fuel to correspond to measured pressure drops in the fuel rail 3 while the flow rate through the pump 8 is temporarily interrupted while applying two different injection regimes, a reference regime and a replacement multiple regime.

The updated non-linear zone can thus be determined and fill out the determination of the flow rate characteristic in real time, determining the global or the individual characteristic, since the real offset Or has already been determined and the gain G is assumed to be constant and equal to the theoretical gain, or can be updated using any other strategy adapted for this purpose.

The invention claimed is:

1. A method of determining the flow rate characteristic of at least one electrically-controlled fuel injector feeding an internal combustion engine and mounted in a fuel feed circuit of said engine, the determination being in real time and as a function of an injection control duration, and said circuit comprising at least one pump fed from a fuel tank and connected to a common rail for feeding fuel to the injectors of the engine, each injector being controlled by an engine control unit, including at least one calculator and at least one memory, such that on each cycle of the engine, each injector delivers a mass of fuel to the engine as determined by said injector flow rate characteristic, which expresses the mass injected as an increasing function of the injection control duration of said injector as controlled by said engine control unit, said flow rate characteristic including a zone that is substantially linear, for injection control duration values greater than a minimum time, and defined by a gain corresponding to its slope, and by an offset at the origin where the extension of the linear zone towards the origin of injection control durations intersects the injection control duration axis, and a non-linear zone for small values of injection control durations, between the offset and said linear zone, the nominal theoretical linear and non-linear zones being initially stored in the engine control unit in the form of a theoretical offset and a theoretical gain for the linear zone, together with at least one table or mathematical relationship for the non-linear zone, the method comprising at least the steps consisting in: assuming that the gain is equal to the theoretical gain or to an updated gain based on the theoretical gain; and for each injector whose characteristic is to be determined, replacing each of at least one reference injection having an injection control duration controlled by the engine control unit in compliance with the stored characteristic, with a multiple injection comprising a succession of at least two injections of injection control durations that are assumed to cause the same mass of fuel to be injected as by the replaced reference injection; in determining the difference in fuel mass between the replaced reference injection and the multiple injection; in deducing therefrom an error in the determination of said characteristic; and in modifying the gain and/or the offset of the linear zone or at least of a table or mathematical relationship for the non-linear zone so as to compensate said error, and storing the new characteristic as determined in this way.

2. A method according to claim 1, comprising at least steps consisting in initially determining the real offset Or of said linear zone of said characteristic, by replacing each of at least one reference injection of injection control duration T by a number $n \geq 2$ injections having a common injection control duration:

$$\frac{T - Ot}{n} + Ot$$

that is greater than the minimum time, and in which Ot is the nominal or theoretical offset, and in determining that the real offset Or is given by the formula:

$$Or = \frac{Mr - Mr'}{(n-1) \cdot G} + Ot$$

where Mr and Mr' are the masses of fuel injected respectively during applications of the reference injections and of the multiple injections, n is the number of injections of each multiple injection, G is the gain of the injector or of the injectors in question, assuming that the real gain is equal to the theoretical or nominal gain stored in the engine control unit, which also stores the nominal or theoretical offset Ot.

3. A method according to claim 2, comprising at least the steps consisting in determining said non-linear zone after determining said linear zone, and in replacing each of at least one reference injection of injection control duration T in said linear zone, corresponding to an injected mass M, with a multiple injection comprising a succession of $n \geq 2$ injections assumed to give the same injected mass of fuel M as the replaced reference injection and having a common injection control duration situated in the non-linear zone, so as to identify the flow rate characteristic at the corresponding point of its non-linear zone, for which the control duration of each injection of a multiple injection $$Tn = \frac{T - Or}{n} + Or$$

corresponds to an injected mass of fuel M/n, and in varying n and/or Tn in order to identify at least a fraction of the non-linear zone.

4. A method according to claim 2, comprising at least the steps consisting in determining the non-linear zone after determining the linear zone, and in imposing an injection control duration T2 in the non-linear zone for which it is desired to determine the characteristic, and in replacing each of at least one reference injection of injection control duration T in the linear zone corresponding to an injected mass M with a multiple injection of $n \geq 2$ injections assumed to give the same injected mass of fuel M as the replaced reference injection, and one of which has an injection control duration T1 situated in the linear zone, corresponding to an injected mass M1, while each of the other (n−1) injection(s) has a common imposed injection control duration T2, each corresponding to an injected mass M2 such that:

$$M2 = \frac{M - M1}{n - 1}$$

and in varying T2, less than the minimum time (TinfL), and/or varying n, so as to determine at least a portion of the non-linear zone.

5. A method according to claim 1 wherein said injected fuel mass difference is determined by taking account of the variation of the richness of the air/fuel mixture, on the basis of a signal delivered to the engine control unit by a λ probe detecting the oxygen content in the exhaust gas of the engine, and on the basis of the mass of air admitted to the engine.

6. A method according to claim 5, wherein said injected fuel mass difference is calculated by the engine control unit on the basis of the signal from the λ probe and an objective mass of fuel to be injected, said objective mass being established by taking account of the mass of air admitted to the engine and an objective richness signal.

7. A method according to claim 1, wherein, when the fuel feed circuit is of the type having a fixed volume without a permanent return of fuel from downstream to upstream of said pump which is delivery-rate controlled, and in which the engine control unit has in its memory a model of the behavior of the circuit, said injected fuel mass difference is determined on the basis of said circuit behavior model, as a function of the variation of pressure in the fuel circuit after an imposed disturbance to the operation of the pump.

8. A method according to claim 7, wherein said injected fuel mass difference is determined as a function of pressure drop in the feed circuit resulting from stopping said feed pump, firstly while applying at least one reference injection, and secondly while applying the replacement multiple injection(s), the circuit behavior model providing a correspondence between each pressure drop and an injected mass of fuel.

9. A method according to claim 1, the method being applied either to all of the injectors of an engine, or else to a single injector at a time.

10. A method according to claim 9, the method being applied in succession to each of the injectors of the engine in order to discover their individual characteristics.

* * * * *